(12) United States Patent
DeSimone et al.

(10) Patent No.: US 6,512,062 B1
(45) Date of Patent: Jan. 28, 2003

(54) POLYMERIZATION OF NON-FLUORINATED MONOMERS IN CARBON DIOXIDE

(75) Inventors: Joseph M. DeSimone, Chapel Hill, NC (US); Terri J. Carson, Pearlind, TX (US); Hiroshi Shiho, Yokkaichi (JP); Jeremy Lizotte, Roanoke Rapids, NC (US)

(73) Assignees: The University of North Carolina at Chapel Hill, Chapel Hill, NC (US); North Carolina State University, Raleigh, NC (US)

( * ) Notice: Subject to any disclaimer, the term of this patent is extended or adjusted under 35 U.S.C. 154(b) by 0 days.

(21) Appl. No.: 09/545,437

(22) Filed: Apr. 7, 2000

Related U.S. Application Data

(60) Provisional application No. 60/128,353, filed on Apr. 8, 1999.

(51) Int. Cl.[7] .................................................. C08F 2/00
(52) U.S. Cl. ................ 526/201; 526/264; 526/303.1; 526/317.1; 526/320; 526/328.5
(58) Field of Search ................. 526/264, 201, 526/303.1, 317.1, 320, 328.5; 524/458

(56) References Cited

U.S. PATENT DOCUMENTS

| | | | |
|---|---|---|---|
| 3,522,228 A | 7/1970 | Fukui et al. ................ 260/94.9 |
| 5,312,882 A | 5/1994 | DeSimone et al. ......... 526/201 |
| 5,382,623 A | 1/1995 | DeSimone et al. ......... 524/557 |
| 5,451,633 A | 9/1995 | DeSimone et al. ......... 524/731 |
| 5,494,954 A | 2/1996 | Das et al. ................... 524/315 |
| 5,496,901 A | 3/1996 | DeSimone ................... 526/89 |
| 5,688,870 A | 11/1997 | Wilkinson et al. .......... 525/244 |
| 6,191,215 B1 * | 2/2001 | Beckham et al. ........... 524/731 |

FOREIGN PATENT DOCUMENTS

WO   WO 00/53639   9/2000   ............. C08F/2/04

OTHER PUBLICATIONS

Adamsky et al.; *Inverse Emulsion Polymerization of Acrylamide in Supercritical Carbon Dioxide*, Macromolecules 27:312–314 (1994).

Canelas et al.; *Dispersion Polymerization of Styrene in Supercritical Carbon Dioxide: Importance of Effective Surfactants*, Macromolecules 29:2818–2821 (1996).

Ray et al.; *Dispersion Polymerization of Acrylamide*, Langmuir 13:2191–2196 (1997).

Shaffer et al.; *Dispersion Polymerizations in Carbon Dioxide Using Siloxane–Based Stabilizers* Macromolecules 29:2704–2706 (1996).

International Search Report; PCT/US00/09410; Date of Mailing: Aug. 2, 2000.

* cited by examiner

*Primary Examiner*—Helen L. Pezzuto
(74) *Attorney, Agent, or Firm*—Myers Bigel Sibley & Sajovec, P.A.

(57) ABSTRACT

A method of forming a water soluble polymer comprises polymerizing a non-fluorinated monomer in a reaction medium comprising carbon dioxide to form a water soluble polymer, wherein the polymerization is carried out in the presence of a surfactant that stabilizes the water soluble polymer in the reaction medium.

37 Claims, 14 Drawing Sheets

FLUORINATED SURFACTANTS.
*CONTAINS CA.25% -CF$_3$ BRANCHES

SEMs of PVP particles synthesized with various amounts of poly(FOA):
0 wt %

SEMs of PVP particles synthesized with various amounts of poly(FOA): 0.25 wt %

SEMs of PVP particles synthesized with various amounts of poly(FOA):
0.5 wt %

SEMs of PVP particles synthesized with various amounts of poly(FOA):
2 wt %

SEMs of PVP particles synthesized with various amounts of poly(FOA):
4 wt %

SEMs of PVP particles synthesized with various amounts of poly(FOA):
6 wt %

SEMs of PVP latex particles synthesized with 20 w/v % VP

SEMs of PVP latex particles synthesized with 40 w/v % VP

SEMs of PVP latex particles synthesized with
60 w/v % VP

SEMs of PVP particles synthesized by dispersion polymerization using PTAN

SEMs of PVP particles synthesized by dispersion polymerization using HMW poly(FOA)

SEMs of PVP particles synthesized by dispersion polymerization using PDMS as surfactant PIPA particles produced from IPA (10 w/v %) precipitation polymerization in $CO_2$

POLYMERIZATION OF NON-FLUORINATED MONOMERS IN CARBON DIOXIDE

CROSS REFERENCE TO RELATED APPLICATIONS

The instant application claims priority to Provisional Application Ser. No. 60/128,353 filed Apr. 8, 1999, the disclosure of which is incorporated herein by reference in its entirety.

FIELD OF THE INVENTION

The present invention generally relates to the polymerization of monomers in carbon dioxide to form water soluble polymers.

BACKGROUND OF THE INVENTION

In recent years, carbon dioxide has been proposed an attractive solvent for the homogeneous polymerization of fluorinated monomers and heterogeneous processes such as dispersion polymerizations. It has an easily accessible critical point with a $T_c$ of 31.1° C. and a $P_c$ of 73.8 bar. Within this region, supercritical $CO_2$ exists as a low viscosity medium with tunable densities. Two classes of polymers have shown appreciable solubilities in supercritical $CO_2$: amorphous fluoropolymers and silicones. Both classes of materials have been found to be efficient stabilizers in the dispersion polymerization of olefinic monomers in carbon dioxide. The dispersion polymerization of methyl methacrylate (MMA) in supercritical carbon dioxide using a fluorinated polymeric surfactant, poly(1,1-dihydroperfluorooctyl acrylate) [poly(FOA)] has been proposed by DeSimone, J. et al., Science, 1994, 265, 356. These polymerizations yielded micrometer-sized particles with potentially narrow size distributions. After further investigation, this system was extended to include poly(dimethylsiloxane) [PDMS] which contained a polymerizable end group. The dispersion polymerization of styrene in carbon dioxide has also been proposed.

Limited research efforts have been reported on the dispersion polymerization of water soluble vinylic monomers in carbon dioxide. Adamsky and Beckman, Macromolecules, 1994, 27, 312–314 reported the inverse emulsion polymerization of acrylamide in supercritical $CO_2$, but the dispersion process remains to be explored.

SUMMARY OF THE INVENTION

In one aspect, the invention provides a method of forming a water soluble polymer. The method comprises polymerizing a non-fluorinated monomer in a reaction medium comprising carbon dioxide to form a water soluble polymer. The polymerization is carried out in the presence of a surfactant that stabilizes the water soluble polymer in the reaction medium.

In another aspect, the invention provides a method of forming a water soluble polymer. The method comprises polymerizing a non-fluorinated monomer in a reaction medium comprising carbon dioxide to form a water soluble polymer, wherein the polymerization is carried out in the presence of a surfactant that stabilizes the water soluble polymer in the reaction medium. Thereafter, the reaction medium is separated from the water soluble polymer to isolate the water soluble polymer.

In another aspect, the invention provides a reaction mixture comprising a non-fluorinated monomer, a reaction medium comprising carbon dioxide, and a surfactant.

In another aspect, the invention provides a method of making a water soluble polymer. The method comprises polymerizing a non-fluorinated acrylamide-based monomer in the presence of an initiator in a reaction medium comprising carbon dioxide to form a water soluble polymer. The non-fluorinated monomer and initiator are solubilized in the carbon dioxide reaction medium and the polymerization is a precipitation polymerization.

In another aspect, the invention comprises a composition of matter.

The composition of matter comprises a non-fluorinated acrylamide-based monomer, an initiator, and a reaction medium comprising carbon dioxide. The non-fluorinated acrylamide-based monomer and initiator are solubilized in the reaction medium, and the non-fluorinated acrylamide-based monomer is capable of reacting to form a water soluble polymer which precipitates out of the reaction medium.

These and other aspects and advantages of the invention are set forth in detail hereinbelow.

DETAILED DESCRIPTION OF THE PREFERRED EMBODIMENTS

Figure 1:
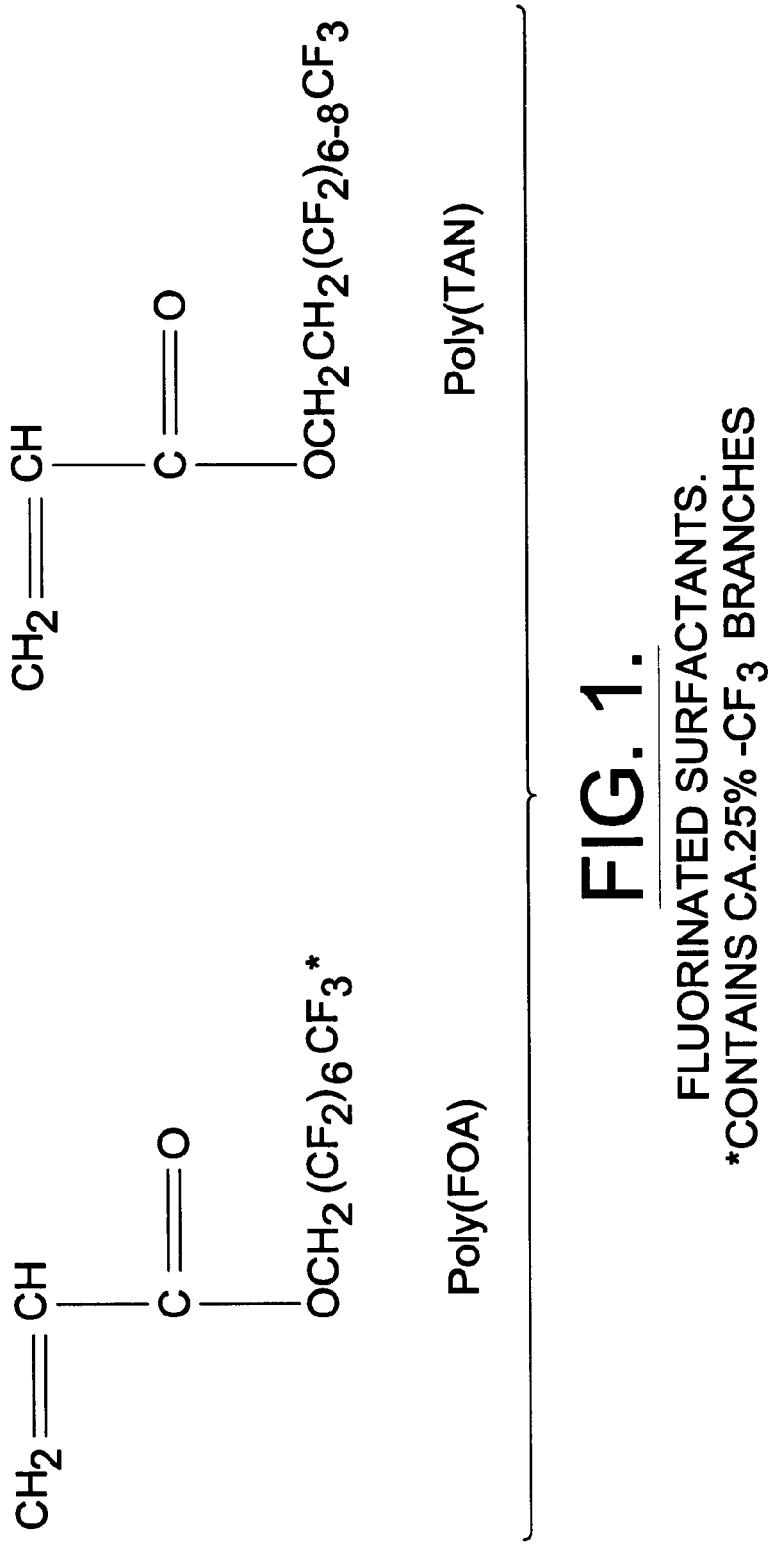
FIG. 1 illustrates formulas of fluorinated surfactants employed in certain embodiments of the invention.
Figure 2A:
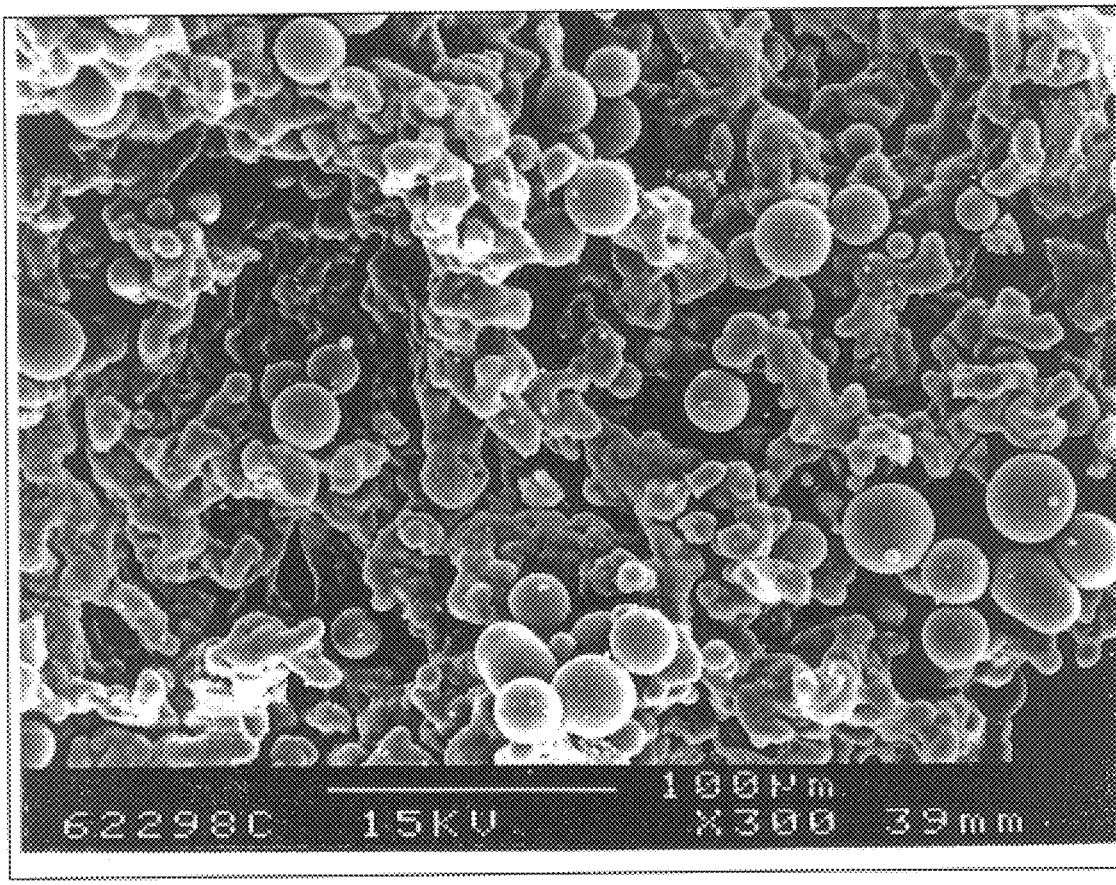
FIGS. 2A through 2F illustrate Scanning Electron Microscope (SEM) photographs of poly(N-vinyl pyrrolidone) (PVP) particles synthesized with various amounts of poly (FOA): (a) 0 weight percent; (b) 0.25 weight percent; (c) 0.5 weight percent; (d) 2 weight percent; (e) 4 weight percent; and (f) 6 weight percent.
Figure 2B:
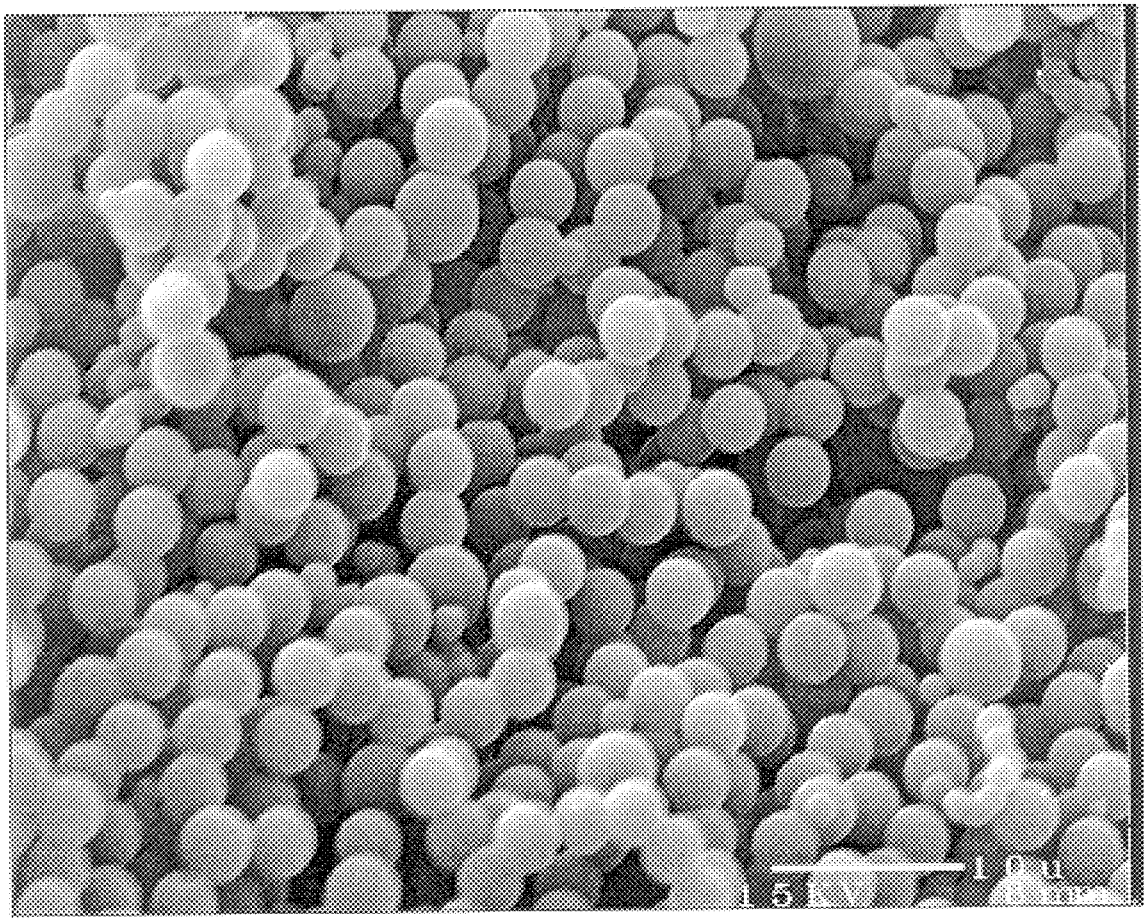
Figure 2C:
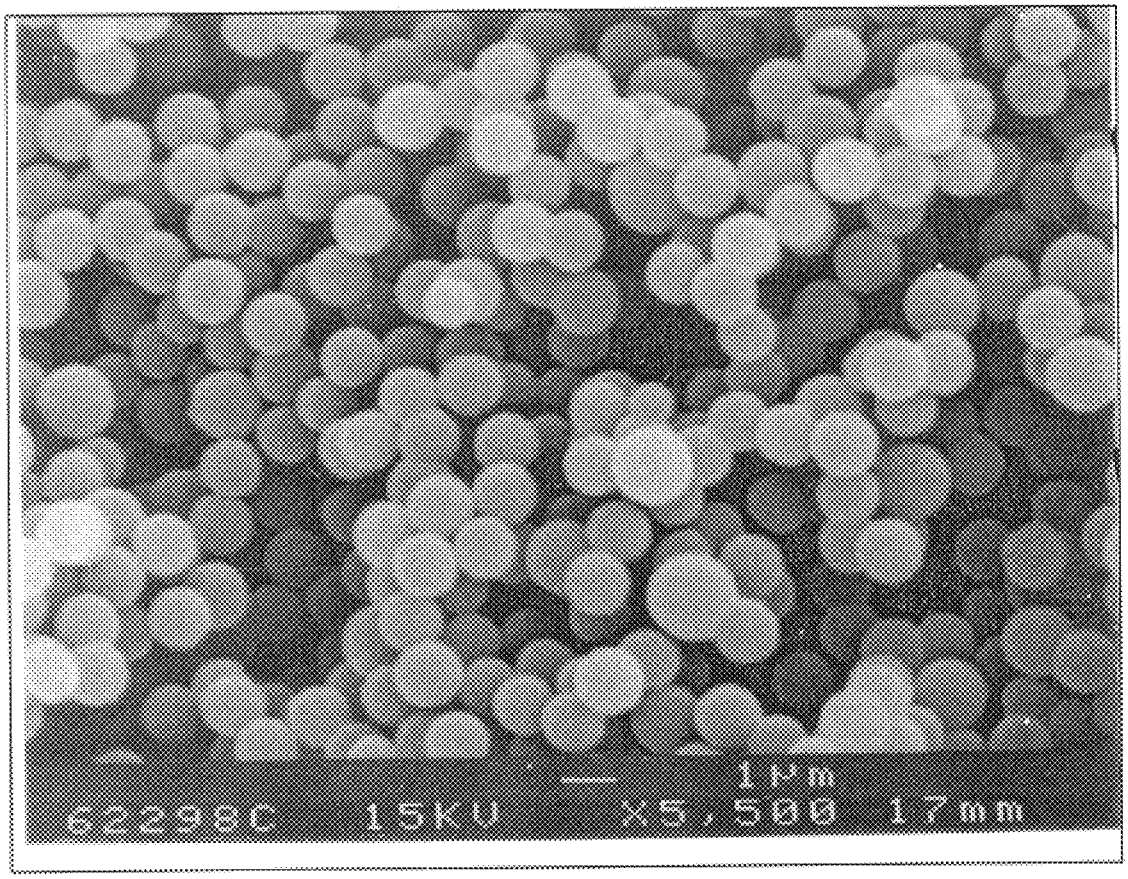
Figure 2D:
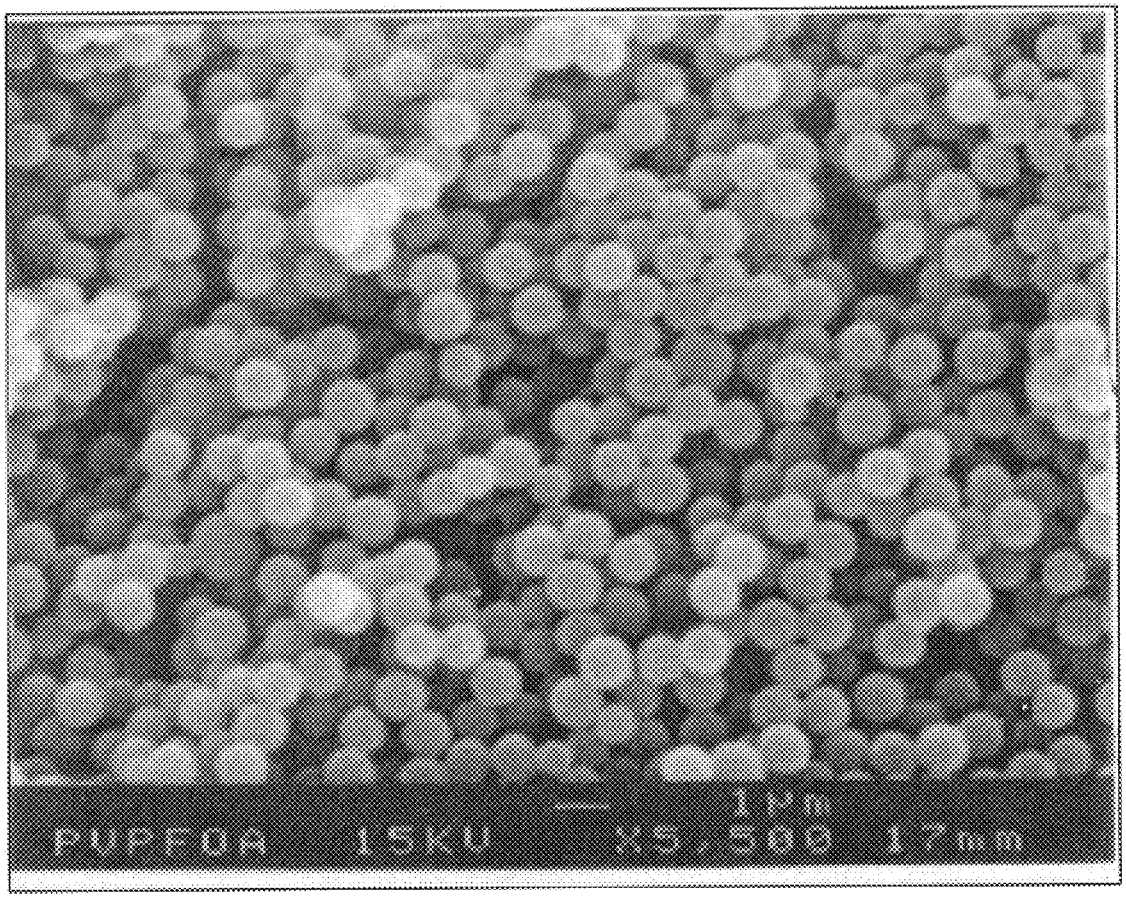
Figure 2E:
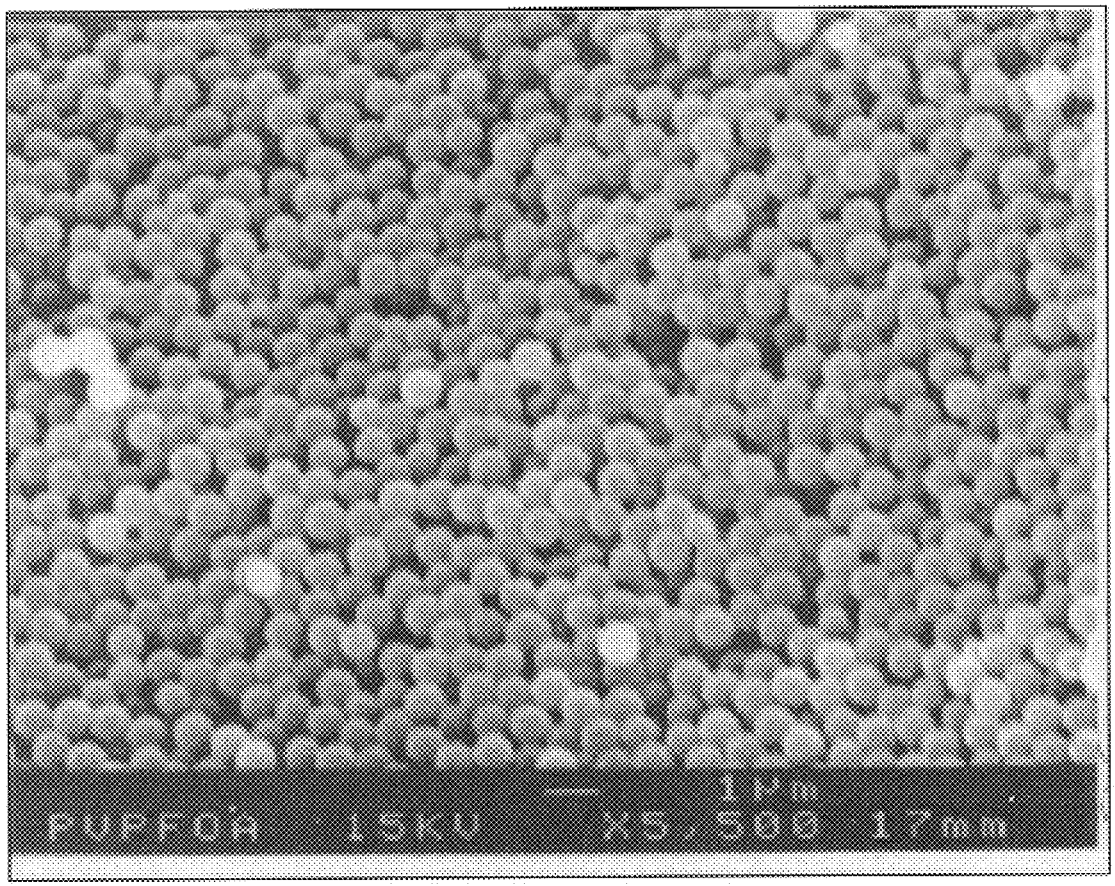
Figure 2F:
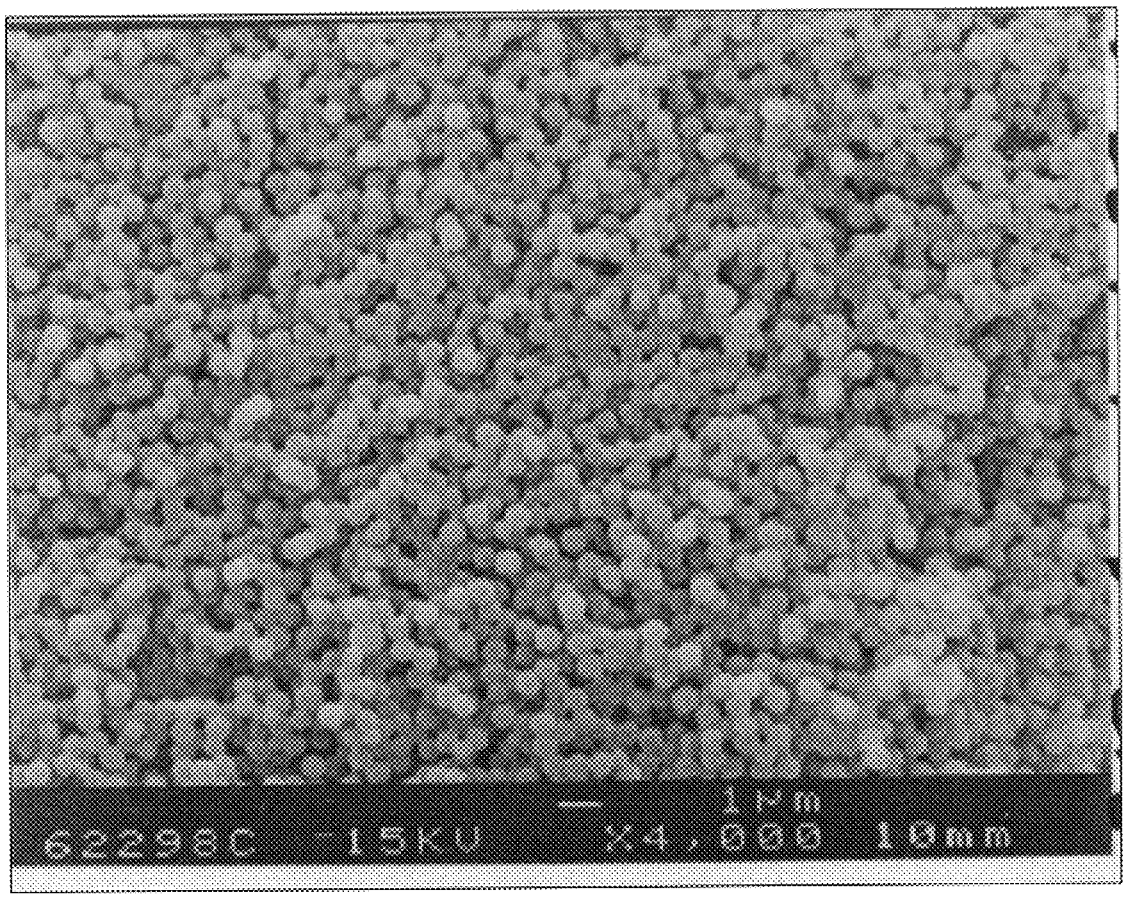

The invention will now be described in greater detail with respect to the preferred embodiments set forth below. It should be understood that these embodiments are set forth to illustrate the invention, and do not limit the scope of the invention as defined by the claims.

In one aspect, the present invention proposes the polymerization of non-fluorinated monomers in carbon dioxide to form water soluble polymers. Various monomers may be employed, such as, for example, vinylic monomers. In one aspect, the invention provides a method of forming a water soluble polymer comprising polymerizing a non-fluorinated monomer in a reaction medium comprising carbon dioxide to form a water soluble polymer. The monomers may be soluble or insoluble in carbon dioxide. In one embodiment, the invention may provide for the suspension polymerization of the monomer in which instance the monomer is not soluble in carbon dioxide. The term suspension polymerization being defined as known in the art. In this instance, the reaction medium is present as a multi-phase system. The reaction medium thus comprises a "monomer-rich phase" and "a $CO_2$-rich phase". In another embodiment, the invention may provide for the dispersion polymerization of the monomer in which instance the monomer is soluble in carbon dioxide. The polymerization is carried out in the presence of a surfactant that stabilizes the water-soluble polymer in the reaction medium. For the purposes of the invention, the term "dispersion polymerization" refers to a process wherein the monomer, surfactant, and other ingredients (e.g., initiator) are soluble in the carbon dioxide. As the reaction proceeds and the polymer chain grows, the polymer eventually precipitates out of the carbon dioxide (i.e., becomes insoluble) and is stabilized by the surfactant.

In addition to above, for embodiments employing a monomer which is insoluble in carbon dioxide, an initiator may be employed. In the event the initiator is soluble in the $CO_2$-rich phase, the reaction medium is present in the form of an inverse emulsion. In the event the initiator is soluble in the "monomer rich phase", the reaction medium is present in the form of a suspension.

The invention may also provide for the polymerization of a monomer in carbon dioxide to form a water soluble polymer in which water is used. In this embodiment, the reaction mixture includes the monomer which is preferably water soluble and $CO_2$ insoluble, carbon dioxide, a surfactant, and water in the amount less than about 30 percent based on the weight of the reaction mixture contents, more preferably less than about 16 or 15 percent, still more preferably less than about 10 percent by weight, and most preferably less than about 5 percent by weight.

Subsequent to the formation of the water soluble polymer in accordance with the above, the methods of the invention may also include separating the water soluble polymer from the reaction medium by using known techniques, such as, for example, venting the carbon dioxide to the atmosphere.

For the purposes of the invention, carbon dioxide is employed as a fluid in a reaction medium in a gaseous, liquid, or supercritical phase, or combinations of the above. The reaction medium typically employs carbon dioxide as a continuous phase, with the reaction medium typically comprising from about 70 to about 80 percent by weight of carbon dioxide, more preferably from about 73 to about 80 percent by weight of carbon dioxide, and most preferably from about 75 to about 80 percent by weight of carbon dioxide. Gaseous carbon dioxide is typically employed at pressures ranging from about 800 to about 950 psig. If liquid $CO_2$ is used, the temperature employed during the process is preferably below 31° C. In one preferred embodiment, the $CO_2$ is utilized in a "supercritical" phase. As used herein, "supercritical" means that a fluid medium is at a temperature that is sufficiently high that it cannot be liquefied by pressure. The thermodynamic properties of $CO_2$ are reported in Hyatt, *J. Org. Chem.* 49: 5097–5101 (1984); therein, it is stated that the critical temperature of $CO_2$ is about 31° C.

In particular, the methods of the present invention are preferably carried out at a temperature ranging from about 55° C. to about 100° C., more preferably 60° C. to about 75° C. The pressures employed preferably range from about 1000 or about 2000 psig to about 6000 or about 6500 psig.

A number of non-fluorinated monomers may be used in the method of the invention. As one example, vinylic monomers may be used. Examples of classes of these monomers include, but are not limited to, acrylate-containing monomers, methacrylate-containing monomers, unsaturated acid monomers, acrylamide-containing monomers, and mixtures thereof. Specific non-fluorinated vinylic monomers include, but are not limited to, 1-vinyl-2-pyrrolidone, hydroxyethyl acrylate, isopropyl acrylamide, dimethyl acrylamide, acrylic acid, methacrylic acid, dimethylaminoethyl methacrylate, and mixtures thereof. Mixtures of these monomers may be used.

In appropriate embodiments, various initiators may be used in the invention. Examples of initiators include, but are not limited to, 2,2-azobis(isobutyronitrile), cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide) hexane; 2,5-dimethyl-2,5-bis(tert-butylperoxy)hexyne; bis (tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di-(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis(2-ethyl-hexanoyl peroxy)hexane; t-amyl peroxy-2-ethylhexanoate; 2,2'-azobis(2-methylpropionitrile); 2,2'-azobis(2,4-methlbutanenitrile); and the like.

Various water-soluble, carbon dioxide insoluble polymers are formed according to the method of the invention. Examples of specific polymers include, but are not limited to, poly(N-vinyl pyrrolidone), poly(hydroxyethyl methacrylate), poly(hydroxyethyl acrylate), poly(isopropyl acrylamide), poly(dimethyl acrylamide), poly(acrylic acid), poly(methacrylic acid), poly(dimethylaminoethyl methacrylate), and mixtures thereof.

Various surfactants may be used in accordance with the invention. Examples of surfactants are set forth in U.S. Pat. Nos. 5,312,882; 5,382,623; 5,451,633; and 5,866,005, the disclosures of which are incorporated herein by reference in their entirety. The surfactant is believed to help stabilize the water soluble polymer. It is preferred that the surfactant contain a segment which has an affinity for the $CO_2$ phase ("$CO_2$-philic") and a segment which does not have an affinity for the $CO_2$-phase ("$CO_2$-phobic") and may be covalently joined to the $CO_2$-philic segment.

Exemplary $CO_2$-philic segments may include a fluorine-containing segment or a siloxane-containing segment. The fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers*, 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctanesulfonamido)ethyl acrylate ("EtFOSEA"), 2-(N-ethylperfluorooctanesulfonamido)ethyl methacrylate ("EtFOSEMA"), 2-(N-methylperfluorooctanesulfonamido)ethyl acrylate ("MeFOSEA"), 2-(N-methylperfluorooctanesulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydro-perfluoroalkylacrylate ("TA-N"), 1,1',2,2'-tetrahydro perfluoroalkylmethacrylate and other fluoromethacrylates ("TM"); fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used.

Exemplary $CO_2$-phobic segments may comprise common lipophilic, oleophilic, and aromatic polymers, as well as oligomers formed from monomers such as ethylene, α-olefins, styrenics, acrylates, methacrylates, ethylene and propylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles.

Surfactants which are suitable for the invention may be in the form of, for example, random, block (e.g., di-block, tri-block, or multi-block), blocky (those from step growth polymerization), and star homopolymers, copolymers, and co-oligomers. Exemplary block copolymers include, but are not limited to, polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), and a diblock copolymer of poly(2-hydroxyethyl methacrylate) and poly(1,1-dihydroperfluorooctyl methacrylate). Statistical copolymers of poly(1,1-dihydroperfluoro octyl acrylate) and polystyrene, along with poly(1,1-dihydroperfluorooctyl methacrylate) and poly(2-hydroxyethyl methacrylate) can also be used. Graft copolymers may be also be used and include, for example, poly(styrene-g-dimethylsiloxane), poly(methyl acrylate-g-1,1'dihydroperfluorooctyl methacrylate), and poly(1,1'-dihydroperfluorooctyl acrylate-g-styrene). Other examples can be found in I. Piirma, *Polymeric Surfactants* (Marcel Dekker 1992); and G. Odian, *Principals of Polymerization* (John Wiley and Sons, Inc. 1991). The reaction medium preferably comprises from about 0.25 to about 6 percent by weight of surfactant.

Various additives may be used in the reaction mixtures employed in the methods of the invention if so desired. Examples of these additives include, but are not limited to, additives that regulate molecular weight of the water-soluble polymers or that control its functionality. Crosslinking agents may also be employed to affect crosslinking of the polymer. Reagents that may control process variables such as reaction times, alter the flow characteristics of the fluid used for the reaction medium may also be employed. Optionally, co-solvents may be used. Mixtures of any of the above components can be employed as known by one skilled in the art.

In another aspect, the invention provides a method of making a water soluble polymer. The method comprises polymerizing a non-fluorinated acrylamide-based monomer in the presence of an initiator in a reaction medium comprising carbon dioxide to form a water soluble polymer. The non-fluorinated monomer and initiator are solubilized in the reaction medium (e.g., the carbon dioxide) and the polymerization is a precipitation polymerization. Preferably, the reaction proceeds in the absence of a surfactant. The resulting polymer chain grows until it reaches a critical chain length and then the polymer precipitates. In various embodiments, the reaction mixture may further include other additives such as, without limitation, those described herein.

The acrylamide-based non-fluorinated monomer may be selected from various monomers within this class. Examples of such monomers include, without limitation, isopropyl acrylamide, methyl acrylamide, ethyl acrylamide, t-butyl acrylamide, and mixtures thereof. Examples of polymers that are formed according to the precipitation reaction of the invention include, without limitation, (poly)isopropyl acrylamide, poly(methyl acrylamide), poly(ethyl acrylamide), poly(t-butyl acrylamide), and mixtures thereof.

The carbon dioxide which is employed in the precipitation polymerization reaction may be present according to any of the embodiments described herein. Preferably, the carbon dioxide is present as supercritical carbon dioxide. In one preferred embodiment, the reaction medium (e.g., carbon dioxide) has a pressure ranging from about 1000 psi to about 6500 psi. In another preferred embodiment, the reaction medium (e.g., carbon dioxide) has a temperature ranging from about 55° C. to about 100° C.

In another aspect, the invention provides a composition of matter. The composition of matter comprises a non-fluorinated acrylamide-based monomer, an initiator, and a reaction medium comprising carbon dioxide. The non-fluorinated acrylamide-based monomer and initiator are solubilized in the reaction medium, and the non-fluorinated acrylamide-based monomer is capable of reacting to form a water soluble polymer which precipitates out of the reaction medium. The composition of matter may encompass any of the embodiments set forth herein.

The methods of the invention may be carried out using known equipment. For example, the fluorination reactions may be carried out either batchwise, continuously, or semi-continuously, in appropriately designed high pressure reaction vessels or cells. Additional features may be employed such as, for example, agitation devices (e.g., a paddle stirrer or impeller stirrer) and heaters (e.g., a heating furnace or heating rods).

The invention will now be described in greater detail with respect to the foregoing example. It is to be understood that this example is set forth to illustrate the invention, and is not intended to limit the invention as defined by the scope of the claims.

EXAMPLE 1

Dispersion Polymerization of 1-vinyl-2-pyrrolidone Using Low Molecular Weight Poly(FOA)

The dispersion polymerization of 1-vinyl-2-pyrrolidone (VP) using low molecular weight poly(FOA) as the stabilizer is set forth. The low molecular weight poly(FOA) (see FIG. 1) surfactant was prepared by a solution free-radical polymerization in supercritical $CO_2$ as described by DeSimone et al., *Science,* 1992, 257, 945. The effects of stabilizer concentration, monomer concentration, and $CO_2$ pressure on the resulting PVP colloid have been investigated. In addition, an extraction study has been conducted which suggests that grafting of poly(FOA) on the PVP particles may be achieved.

Initially, a 10-mL high-pressure reactor view cell was charged with the initiator [2,2 azobis(isobutyronitrile)] and surfactant and the system was purged with argon for 15 min. Degassed monomer was added to the cell via syringe under an argon atmosphere. The cell was then pressurized to approximately 124 bar using an Isco syringe group. The reaction was heated to 65° C., followed by a final pressurization to 340 bar. Initially a clear solution was produced, but as the polymerization proceeded the $CO_2$ phase became hazy and eventually developed into a milky latex. The reaction was allowed to proceed for 24 h with magnetic stirring and was monitored by visual observation through the sapphire windows on the cell. At the end of the reaction, the cell was cooled to room temperature and the $CO_2$ was slowly vented from the cell.

EXAMPLES 2–7

Effect of Surfactant Concentration on Polymerization

Various levels of surfactant were investigated in the polymerization of 1-vinyl 2-pyrrolidone (VP) as set forth in Table 1. VP was found to be miscible with carbon dioxide at the conditions the polymerizations were conducted, displaying clear solutions at the beginning of each reaction. In the absence of stabilizer, the solution developed a milky, white, opaque appearance after 3 h and precipitate formation was observed after 5–6 h. Scanning Electron Microscopy (SEM) was used to determine the morphology of the PVP and the polymer displayed a nondescript morphology (see FIG. 2). For stabilized reactions, the colloid remained stable and produced free-flowing powders after venting the $CO_2$. SEM revealed that the polymer consisted of micrometer-sized spheres with a relatively narrow size distribution. Table 1 summarizes the results obtained from the surfactant concentration studies.

TABLE 1

Effect of Surfactant Concentration (20 w/v % VP, 24 h)

| Examples | Poly(FOA), Wt % | yield, % | $D_n^a$, µm | PSD[b] | Latex Stability[c] |
|---|---|---|---|---|---|
| 2 | 0 | 44 | na[d] | na | ppt. |
| 3 | 0.25 | 86 | 2.89 | 1.20 | ppt. |
| 4 | .50 | 81 | 1.1 | 1.02 | ppt. |
| 5 | 2.0 | 75 | 0.92 | 1.02 | Stable |
| 6 | 4.0 | 91 | 0.73 | 1.02 | Stable |
| 7 | 6.0 | 72 | 0.56 | 1.02 | Stable |

[a]$D_n$ = mean particle diameter.
[b]PSD = particle size distribution, $D_w/D_n$.
[c]ppt. = precipitate formation.
[d]na = not applicable.

As the surfactant concentration increased, the average particle size generally decreased. When no poly(FOA) surfactant was added to the polymerization, low conversion and precipitation resulted after 5 to 6 hours. When 0.25 weight percent and 0.5 weight percent PFOA surfactant was used, precipitation occurred after 9 hours and 18 hours, respectively, with higher conversions. The remaining reactions at higher surfactant concentrations produced stable latexes throughout the entire reaction period.

EXAMPLES 8–11

Effect of Pressure on Polymerization

The effect of different pressures on the PVP colloid was investigated as shown in Table 2.

TABLE 2

Pressure Study for 1-Vinyl-2-Pyrrolidone Polymerization in $CO_2$[a]

| Examples | Initial Pressure Bar | Final Pressure Bar | $\Delta P^b$ (bar) | Yield, % | $D_n^c$, µm | PSD[d] | Latex Stability[e] |
|---|---|---|---|---|---|---|---|
| 8 | 351 | 337 | −14 | 82 | 1.00 | 1.10 | stable |
| 9 | 282 | 310 | +28 | 77 | 1.20 | 1.16 | stable |
| 10 | 220 | 268 | +48 | 63 | 1.29 | 1.10 | stable |
| 11 | 141 | 155 | +14 | 64 | 1.20 | 1.18 | ppt. |

[a]Reaction conditions: 0.0200 g of AIBN; 2.0 g of VP; 2 wt % poly(FOA), T = 65° C. 3 h reaction time.
[b]$\Delta P$ = change in pressure.
[c]$D_n$ = mean particle diameter.
[d]PSD = particle size distribution.
[e]ppt.= precipitate formation.

All reactions produced stable lattices with the exception of the lowest pressure, which resulted in visibly flocculated product after 20 min.

EXAMPLES 12–14

Effect of Monomer Concentration on Polymerization

The effect of the initial concentration of the monomer was investigated as shown in Table 3.

TABLE 3

Effect of Monomer Concentration[a]

| Entry | % VP[b] | yield, % | $D_n^c$, µm | PSD[d] | Latex Stability[e] |
|---|---|---|---|---|---|
| 12 | 20 | 66 | 0.82 | 1.05 | Stable |
| 13 | 40 | 83 | 2.57 | 1.07 | ppt. |
| 14 | 60 | 82 | 3.73 | 1.76 | ppt. |

[a]Reaction conditions: 0.0200 g of AIBN; 2 wt % poly(FOA): T = 65° C. 3 h reaction time.
[b]w/v % in $CO_2$.
[c]$D_n$ = mean particle diameter.
[d]PSD = particle size distribution.
[e]ppt. = precipitate formation.

Figure 3A:
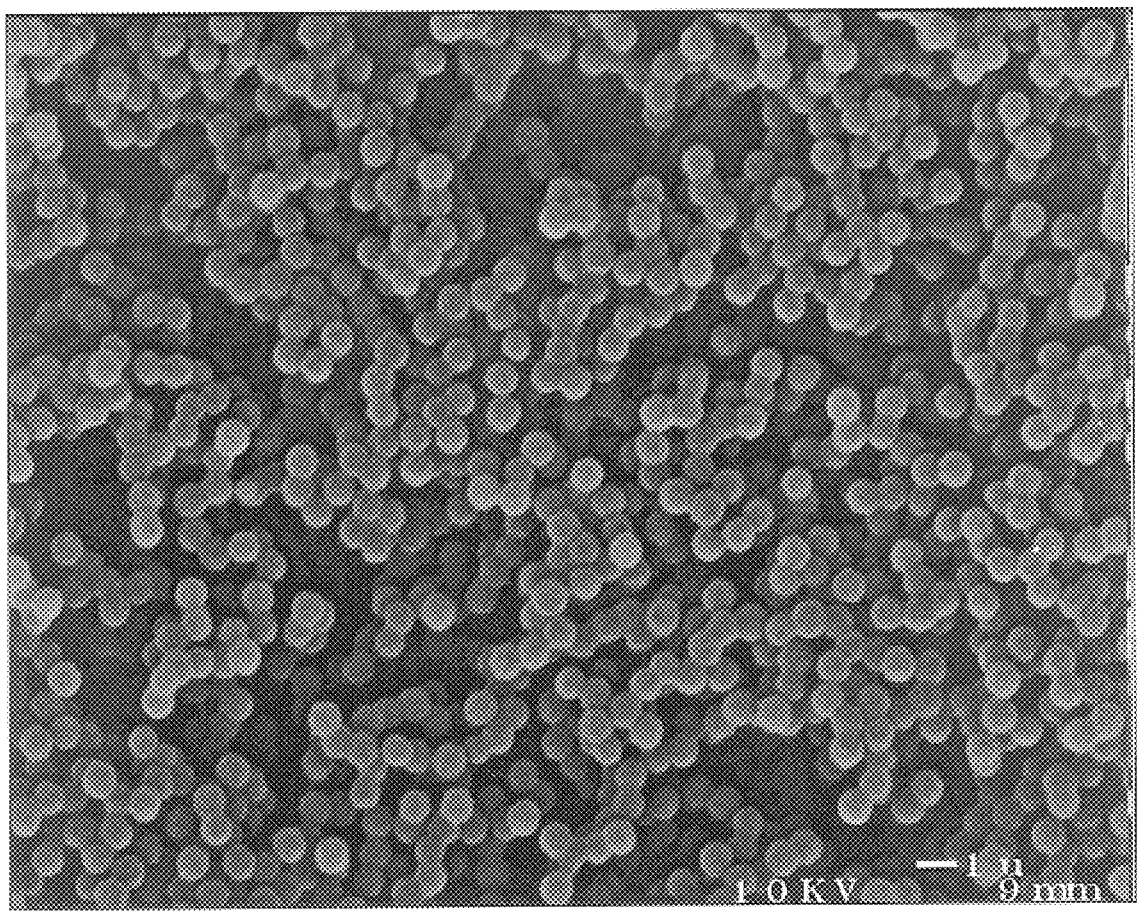
FIGS. 3A through 3C illustrate SEM photographs of PVP latex particles synthesized with (a) 20 w/v percent of n-vinyl pyrrolidone (VP); (b) 40 w/v percent of VP; and (c) 60 w/v percent of VP.
Figure 3B:
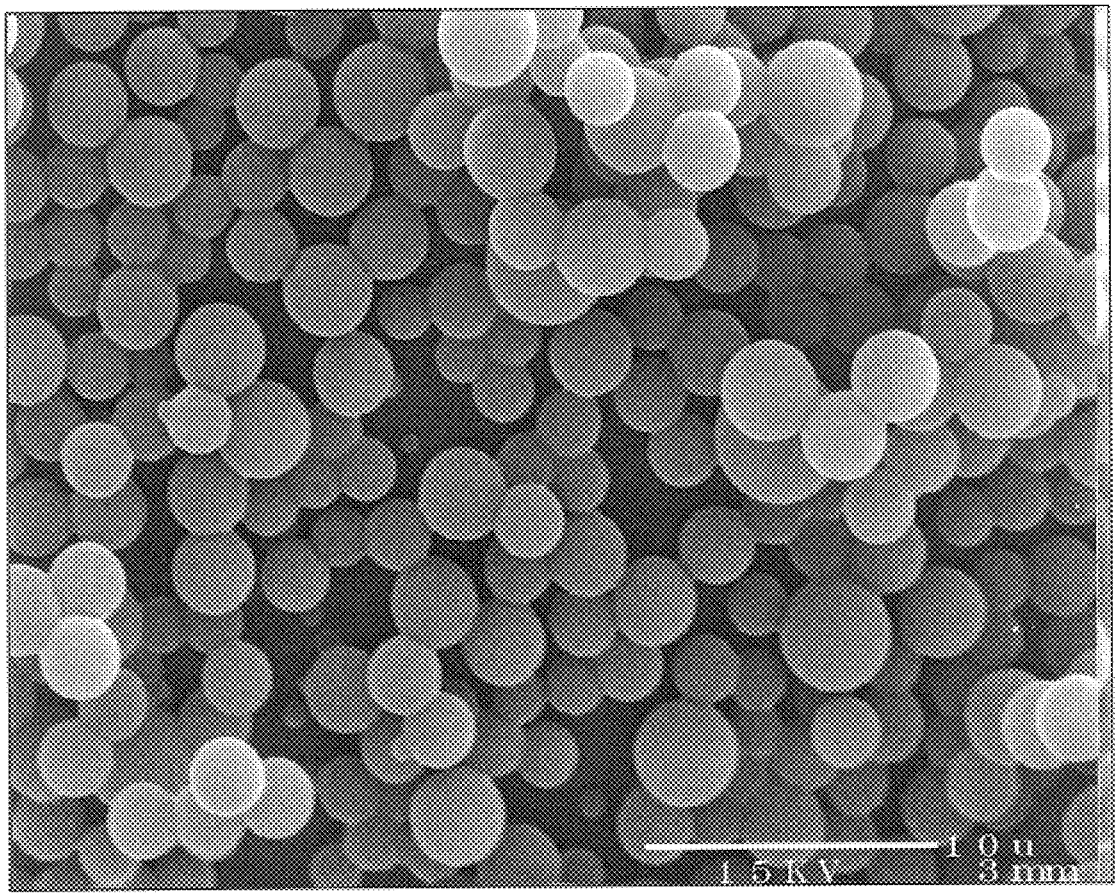
Figure 3C:
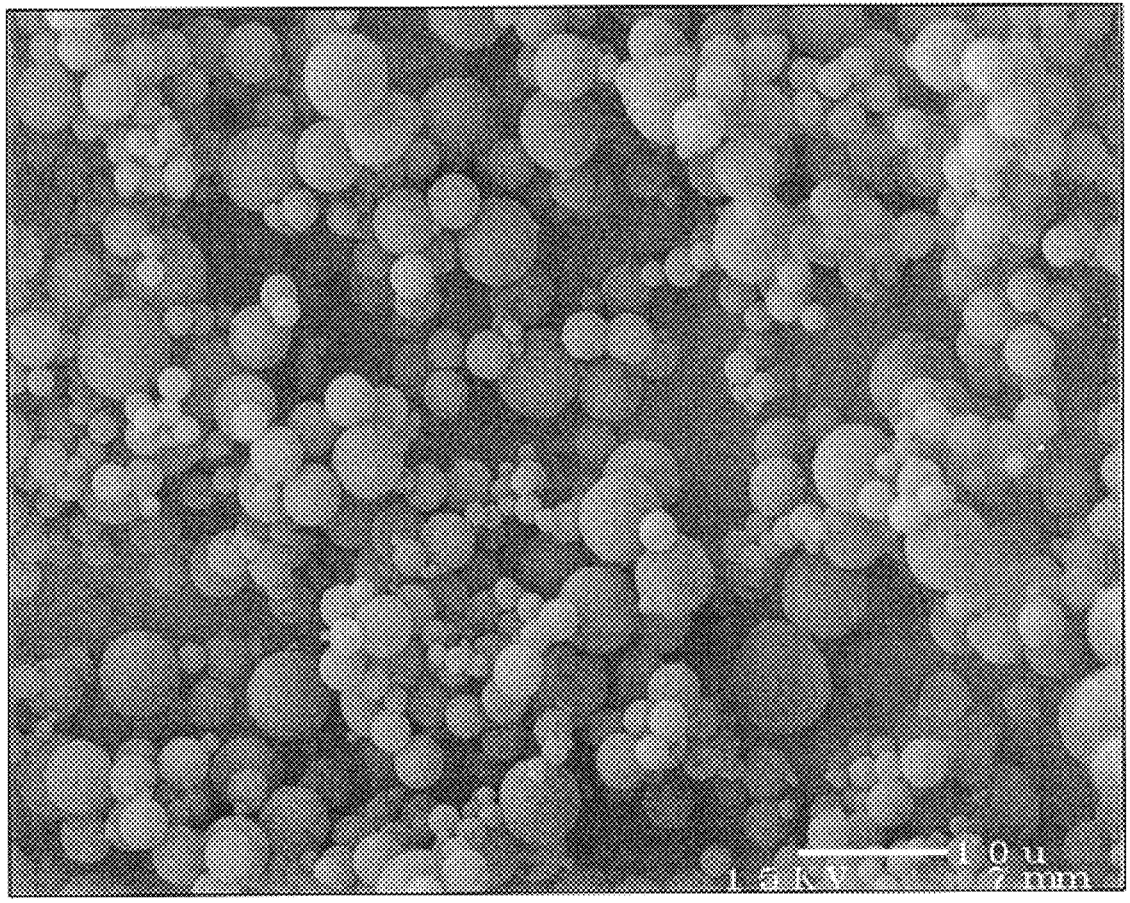
Figure 4A:
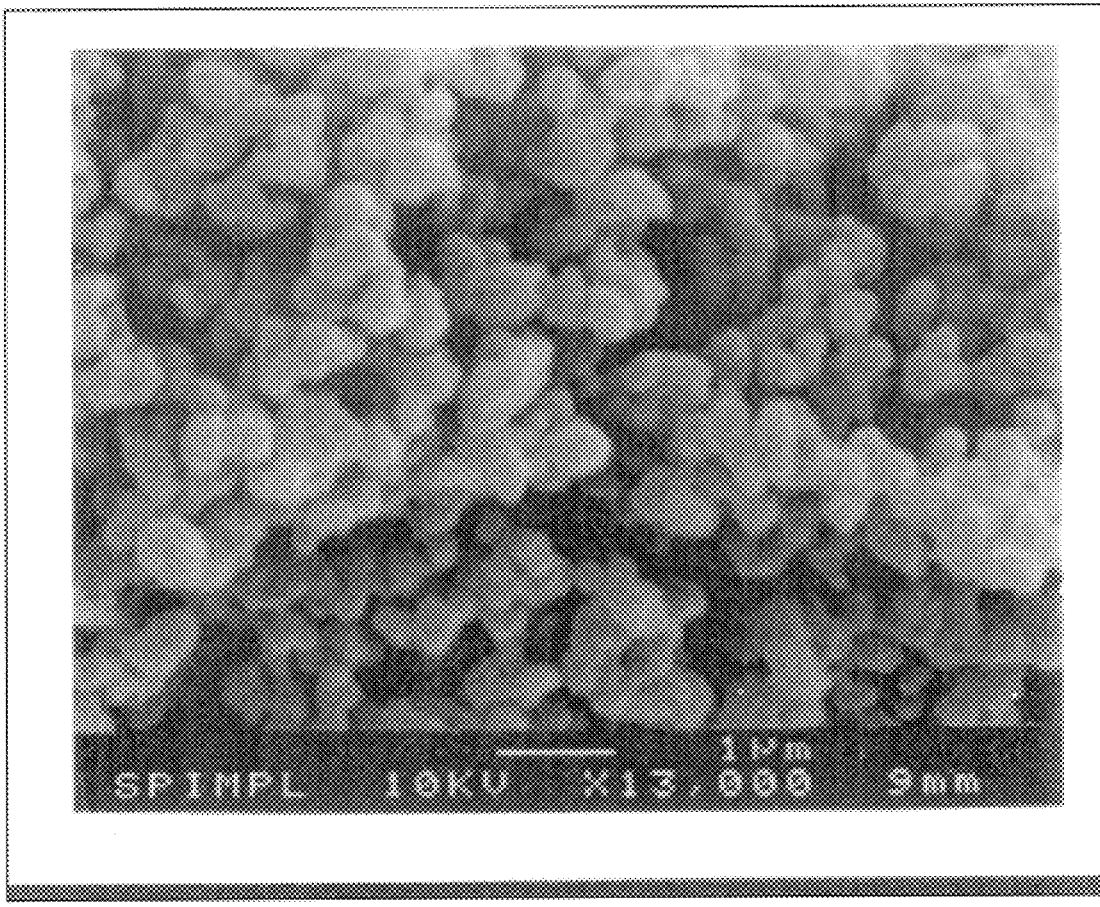
FIGS. 4A through 4C illustrate SEM photographs synthesized by dispersion polymerization using (a) PTAN, (b) HMW poly(FOA), and (c) PDMS as surfactant.
Figure 4B:
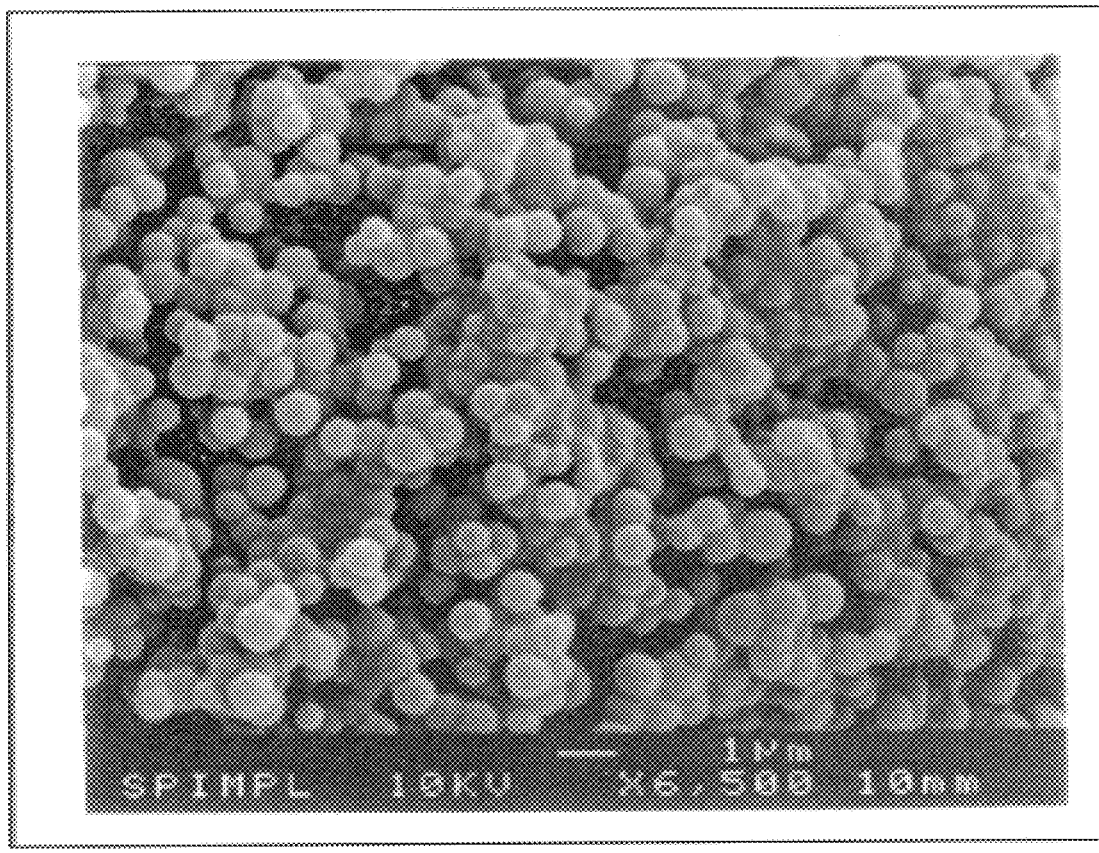
Figure 4C:
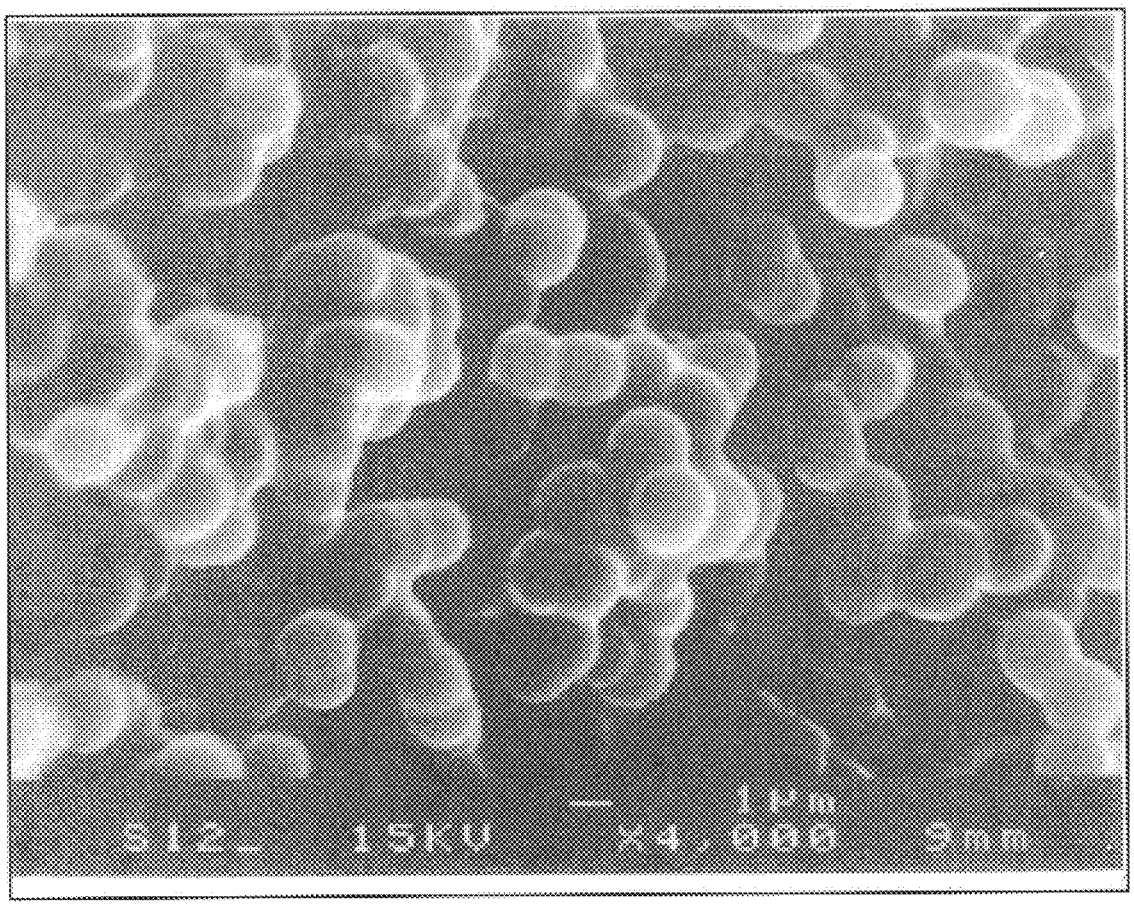

The SEM micrographs illustrating the results of these examples are set forth in FIG. 3. These results show that as monomer concentration increases, the average particle size and particle size distribution increase. Other surfactants were examined for their efficiency as stabilizers for this system which include PTAN, high molecular weight poly (FOA), and PDMS with a polymerizable end group. The SEM micrographs are shown in FIG. 4. All reactions produced high yields of polymer, but the particles appeared coagulated. Additionally, stable latexes were produced except in the case where PDMS was employed. Precipitation was observed after 2 h.

EXAMPLE 15

Precipitation Polymerization of Isopropyl Acrylamide in $CO_2$

Figure 5:
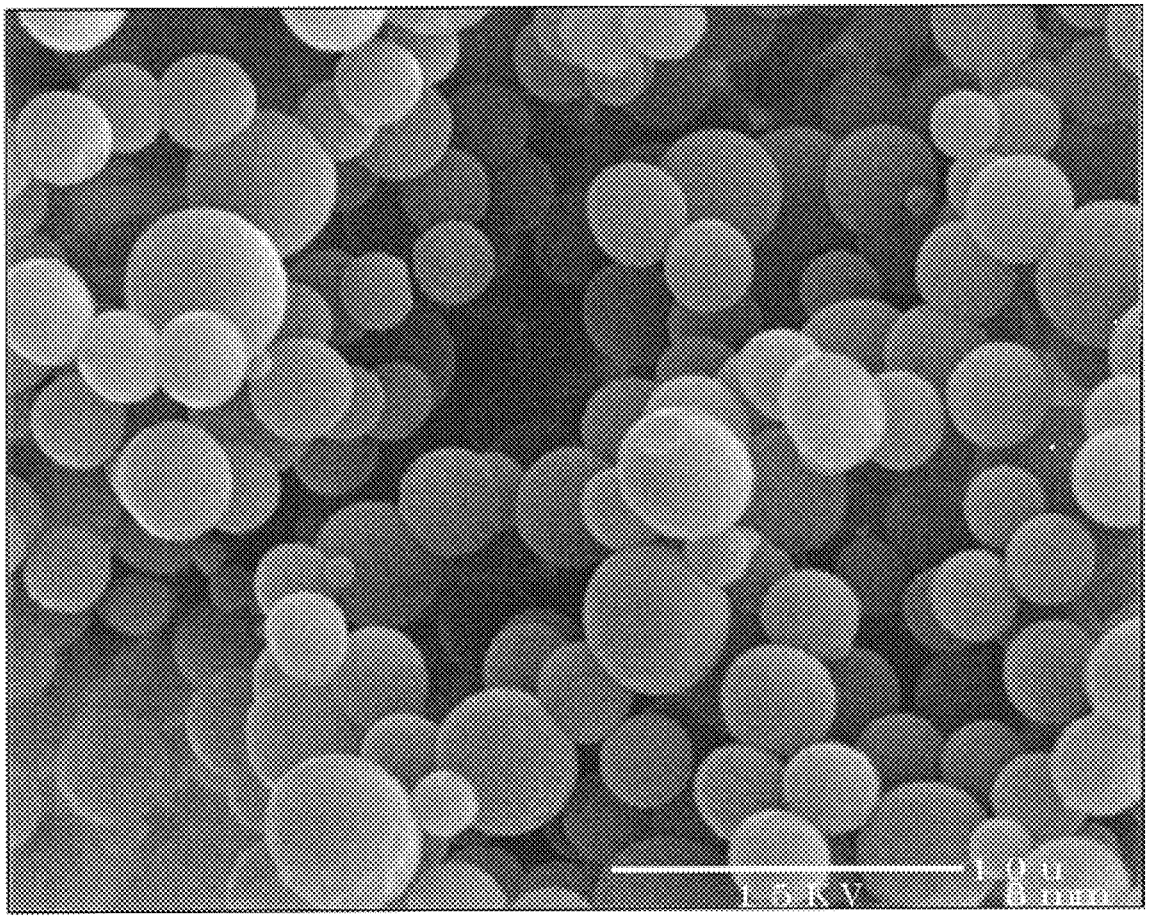
FIG. 5 illustrates (poly)isopropyl acrylamide (PIPA) particles produced from isopropyl acrylamide (10 w/v percent) as a precipitation polymerization in a carbon dioxide reaction medium.

The precipitation polymerization of isopropyl acrylamide has been carried out using carbon dioxide as a reaction medium. This process leads to micron-sized particles with spherical morphologies without the presence of any added stabilizer. The synthetic procedure is similar to the setup of a dispersion polymerization. Initially, a 10 mL high-pressure reactor view cell was charged with 2,2-azobis (isobutyronitrile) and monomer and the system was purged with argon for 15 min. The cell was then pressurized to approximately 83 bar using an Isco syringe pump. The reaction was heated to 65° C., followed by a final pressurization to 413 bar. The monomer was initially added as a solid to the reactor, but as heat was applied to the system, it melted resulting in an insoluble liquid phase in the $CO_2$ phase. Once the final conditions were reached, the monomer dissolved and the solution appeared clear and homogeneous. The reaction time was varied from 0.5 to 48 h and was monitored by visual observation through the sapphire windows on the cell. The $CO_2$ phase became hazy after 0.5 h and eventually produced precipitated polymer that settled on the bottom of the reactor. At the end of the polymerization, the cell was cooled to room temperature and the $CO_2$ was slowly vented from the cell. The polymer was isolated as a white, fluffy powder and SEM was used to determine the morphology of the material. The polymer displayed a well-defined structure that consisted of micron-sized particles with spherical morphologies as illustrated in FIG. 5.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed:

1. A method of forming a water soluble polymer, said method comprising:

polymerizing a non-fluorinated monomer in a reaction medium comprising carbon dioxide to form a water soluble polymer, wherein said polymerization is carried out in the presence of a surfactant that stabilizes said water soluble polymer in the reaction medium, wherein said non-fluorinated monomer is selected from the group consisting of 1-vinyl-2-pyrrolidone, hydroxyethyl acrylate, isopropyl acrylamide, dimethyl acrylamide, acrylic acid, methacrylic acid, dimethylaminoethyl methacrylate, and mixtures thereof, and wherein said surfactant comprises a fluoropolymer.

2. The method according to claim 1, wherein said non-fluorinated monomer is insoluble in carbon dioxide and wherein said reaction medium comprises a monomer-rich phase and a carbon dioxide-rich phase.

3. The method according to claim 2, said reaction medium further comprising an initiator which is soluble in the monomer-rich phase such that said polymerization proceeds as a suspension polymerization.

4. The method according to claim 2, said reaction medium further comprising an initiator which is soluble in the carbon dioxide-rich phase such that said polymerization proceeds as an inverse emulsion polymerization.

5. The method according to claim 1, wherein said non-fluorinated monomer is soluble in carbon dioxide, and wherein said polymerizing step is a dispersion polymerization.

6. The method according to claim 1, wherein said reaction medium further comprises a crosslinking agent.

7. The method according to claim 1, wherein said carbon dioxide is supercritical carbon dioxide.

8. The method according to claim 1, wherein said carbon dioxide is liquid carbon dioxide.

9. The method according to claim 1, wherein said carbon dioxide is gaseous carbon dioxide.

10. The method according to claim 1, wherein said water soluble polymer is selected from the group consisting of poly(N-vinyl pyrrolidone), poly(hydroxyethyl methacrylate), poly(hydroxyethyl acrylate), poly(isopropyl acrylamide), poly(dimethyl acrylamide), poly(acrylic acid), poly(methacrylic acid), poly(dimethylaminoethyl methacrylate), and mixtures thereof.

11. The method according to claim 1, wherein said surfactant comprises a $CO_2$-philic segment and a $CO_2$-phobic segment, and wherein said $CO_2$-philic segment is covalently bonded to $CO_2$-phobic segment.

12. The method according to claim 11, wherein said $CO_2$-philic segment comprises a polymer having at least one segment selected from the group consisting of a fluorine-containing segment, a siloxane-containing segment, and mixtures thereof.

13. A method of forming a water soluble polymer, said method comprising:

polymerizing a non-fluorinated monomer in a reaction medium comprising carbon dioxide to form a water soluble polymer, wherein said polymerization is carried out in the presence of a surfactant that stabilizes said water soluble polymer in the reaction medium, wherein said non-fluorinated monomer is selected from the group consisting of 1-vinyl-2-pyrrolidone, hydroxyethyl acrylate, isopropyl acrylamide, dimethyl acrylamide, acrylic acid, methacrylic acid, dimethylaminoethyl methacrylate, and mixtures thereof, and wherein said surfactant comprises a fluoropolymer; and separating said reaction medium from said water soluble polymer to isolate said water soluble polymer.

14. The method according to claim 13, wherein said non-fluorinated monomer is insoluble in carbon dioxide.

15. The method according to claim 13, wherein said non-fluorinated monomer is soluble in carbon dioxide, and wherein said polymerizing step is a dispersion polymerization.

16. The method according to claim 13, wherein said carbon dioxide is supercritical carbon dioxide.

17. The method according to claim 13, wherein said carbon dioxide is liquid carbon dioxide.

18. The method according to claim 13, wherein said carbon dioxide is gaseous carbon dioxide.

19. The method according to claim 13, wherein said water soluble polymer is selected from the group consisting of poly(N-vinyl pyrrolidone), poly(hydroxyethyl methacrylate), poly(hydroxyethyl acrylate), poly(isopropyl acrylamide), poly(dimethyl acrylamide), poly(acrylic acid), poly(methacrylic acid), poly(dimethylaminoethyl methacrylate), and mixtures thereof.

20. The method according to claim 13, wherein said surfactant comprises a $CO_2$-philic segment and a $CO_2$-phobic segment, and wherein said $CO_2$-philic segment is covalently bonded to $CO_2$-phobic segment.

21. The method according to claim 20, wherein said $CO_2$-philic segment comprises a polymer having at least one segment selected from the group consisting of a fluorine-containing segment, a siloxane-containing segment, and mixtures thereof.

22. The method according to claim 13, wherein said separating step comprises venting the reaction medium to the atmosphere to isolate said water soluble polymer.

23. A method of forming a water soluble polymer, said method comprising:

polymerizing a non-fluorinated monomer in a reaction mixture comprising carbon dioxide, water, a surfactant, and the non-fluorinated monomer to form a water soluble polymer, wherein said surfactant stabilizes said water soluble polymer in the reaction mixture, wherein the water is present in an amount less than about 16 percent based on the weight of the reaction mixture, wherein said non-fluorinated monomer is selected from the group consisting of 1-vinyl-2-pyrrolidone, hydroxyethyl acrylate, isopropyl acrylamide, dimethyl acrylamide, acrylic acid, methacrylic acid, dimethylaminoethyl methacrylate, and mixtures thereof, and wherein said monomer is insoluble in carbon dioxide, said polymerization being a heterogeneous polymerization.

24. The method according to claim 23, wherein said carbon dioxide is supercritical carbon dioxide.

25. The method according to claim 23, wherein said carbon dioxide is liquid carbon dioxide.

26. The method according to claim 23, wherein said carbon dioxide is gaseous carbon dioxide.

27. The method according to claim 23, wherein said water soluble polymer is selected from the group consisting of poly(N-vinyl pyrrolidone), poly(hydroxyethyl methacrylate), poly(hydroxyethyl acrylate), poly(isopropyl acrylamide), poly(dimethyl acrylamide), poly(acrylic acid), poly(methacrylic acid), poly(dimethylaminoethyl methacrylate), and mixtures thereof.

28. The method according to claim 23, wherein said surfactant comprises a fluoropolymer.

29. The method according to claim 23, wherein said surfactant comprises a $CO_2$-philic segment and a $CO_2$-phobic segment, and wherein said $CO_2$-philic segment is covalently bonded to $CO_2$-phobic segment.

30. The method according to claim 29, wherein said $CO_2$-philic segment comprises a polymer having at least one segment selected from the group consisting of a fluorine-containing segment, a siloxane-containing segment, and mixtures thereof.

31. A method of making a water soluble polymer, said method comprising:

polymerizing a non-fluorinated acrylamide-based monomer in the presence of an initiator and in the absence of a surfactant in a reaction medium comprising carbon dioxide to form a water soluble polymer, the non-fluorinated monomer and initiator being solubilized in the carbon dioxide reaction medium and wherein said polymerization is a precipitation polymerization.

32. The method according to claim 31, wherein the non-fluorinated acrylamide-based monomer is selected from the group consisting of isopropyl acrylamide, methyl acrylamide, ethyl acrylamide, t-butyl acrylamide, and mixtures thereof.

33. The method according to claim 31, wherein the initiator is selected from the group consisting of 2,2-azobis (isobutyronitrile), cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis (2-ethyl-hexanoyl peroxy)hexane; t-amyl peroxy-2-ethylhexanoate; 2,2'-azobis(2-methylpropionitrile); 2,2'-azobis(2,4-methylbutanenitrile); and mixtures thereof.

34. The method according to claim 31, wherein the polymer is selected from the group consisting of (poly) isopropyl acrylamide, poly(methyl acrylamide), poly(ethyl acrylamide), poly(t-butyl acrylamide), and mixtures thereof.

35. The method according to claim 31, wherein the carbon dioxide is supercritical carbon dioxide.

36. The method according to claim 31, wherein the reaction medium has a pressure ranging from about 1000 psi to about 6500 psi.

37. The method according to claim 31, wherein the reaction medium has a temperature ranging from about 55° C. to about 100° C.

* * * * *